March 16, 1926.
W. C. FISCHER
WINDOW MOUNTING
Filed Nov. 30, 1923
1,577,215
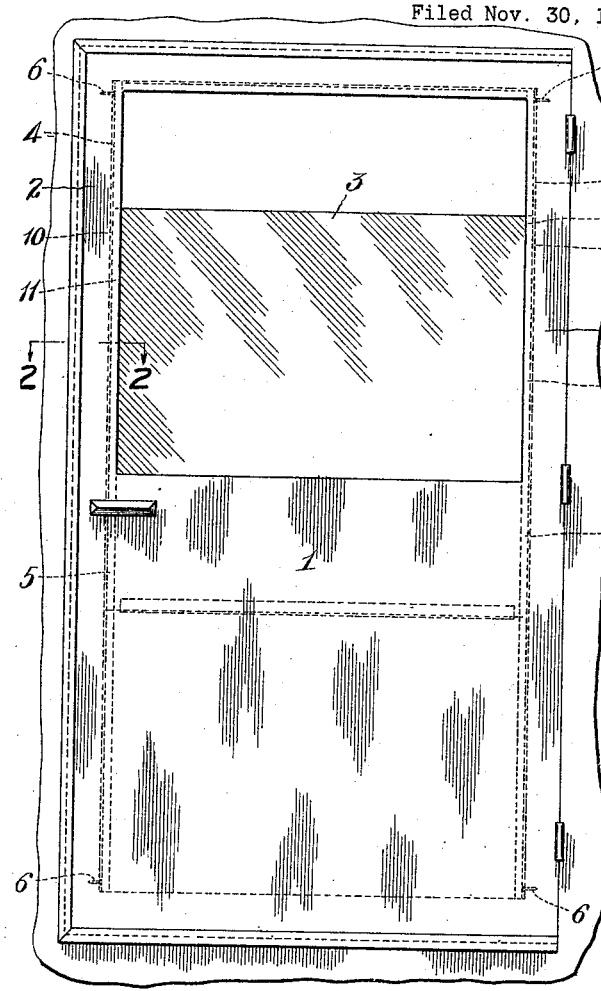
FIG. 1.
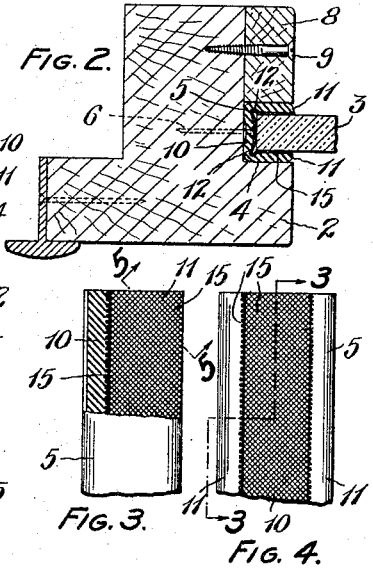
FIG. 2.
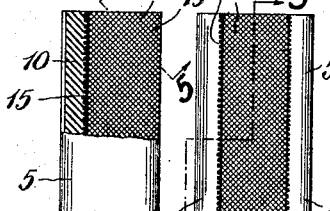
FIG. 3. FIG. 4.
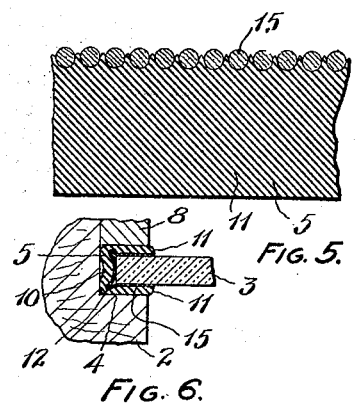
FIG. 5.
FIG. 6.
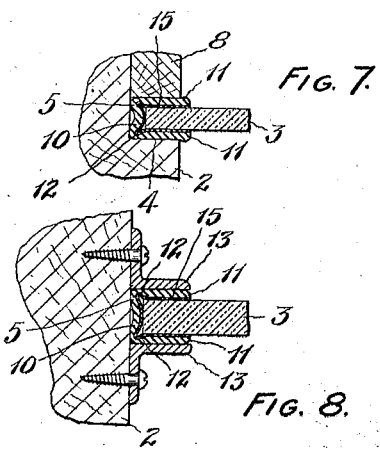
FIG. 7.
FIG. 8.
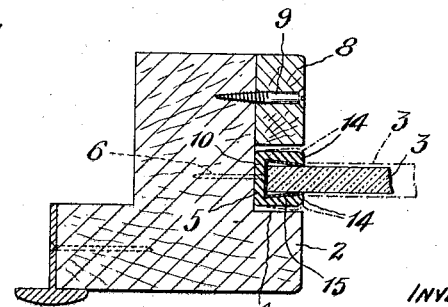
FIG. 9.
INVENTOR:
WILLIAM C. FISCHER
BY Richey, Slough & Watts
ATTORNEYS Patented Mar. 16, 1926.

1,577,215

UNITED STATES PATENT OFFICE.

WILLIAM C. FISCHER, OF CLEVELAND, OHIO, ASSIGNOR TO THE BAKER-RAULANG COMPANY, OF CLEVELAND, OHIO, A CORPORATION OF OHIO.

WINDOW MOUNTING.

Application filed November 30, 1923. Serial No. 677,665.

*To all whom it may concern:*

Be it known that I, WILLIAM C. FISCHER, a citizen of the United States, residing at Cleveland, in the county of Cuyahoga and State of Ohio, have invented certain new and useful Improvements in Window Mountings, of which the following is a specification.

My invention relates to window mountings for windows, particularly sliding glass windows. It is concerned with the provision of a resilient substantially non-frictional guide and retaining member adapted to engage on opposite sides of a glass window adjacent an edge to permit easy sliding movement of the glass therealong.

One object of the invention is to construct a new and improved window guide and retaining member for an edge of a window which is adapted to engage opposite sides of the window adjacent the edge, and which is characterized by being composed of a resilient flexible body molded into or having a substantially integral connection with a foraminous member which is substantially anti-friction to glass.

Another object is to provide a resilient slide channel composed of molded rubber lined on the surfaces thereof which are adapted to contact with a glass window with a fabric substantially anti-friction to glass and which has portions of the rubber molded thereinto.

A further object is to construct a rubber mounting or retaining member of a substantially uniform size which is adapted to fit with a predetermined pressure against the opposite sides of windows of different thicknesses.

A further object is to construct a resilient mounting or retaining member or channel for sliding windows which is capable of being deformed to receive windows of various thicknesses with substantially the same close fit therewith.

A still further object is to construct in an economical manner, a commercially practical slide channel for sliding glass windows such as are used in automobiles, which consists of a molded resilient rubber channel member and a woven or knitted fabric lining for the inner surfaces of the said channel with the rubber penetrating the interstices of the fabric but not extending entirely therethrough.

Other objects ancillary to the foregoing will be pointed out and described hereinafter.

For the purpose of disclosing my invention so that those skilled in the art may be able to practice the same, I have chosen to describe and set forth hereinafter certain structures embodying my invention, but it is to be understood that I do not consider the details shown as necessarily limiting, but merely as typifying my invention.

In the drawings attached hereto and forming a part hereof:

Fig. 1 is an outside elevation of an automobile door having a sliding glass window which is equipped with my improved guide and retaining member.

Fig. 2 is a cross section taken on line 2—2 of Fig. 1.

Fig. 3 is a side elevation, partly broken away, of my improved channel member.

Fig. 4 is an enlarged side elevation of a portion of the channel member shown in Fig. 3.

Fig. 5 is an enlarged fragmentary cross sectional view taken on line 5—5 of Fig. 3.

Figs. 6 and 7 are enlarged fragmentary cross sectional views showing the application of my improved form of slide channel to windows of different thicknesses.

Fig. 8 is a fragmentary cross sectional view showing a modified form of channel holding means, and Fig. 9 is a cross sectional view of a modified form of window mounting in which the channel is substantially wedge shaped.

In the drawings 1 designates as an entirety an automobile door having a frame 2 and a sliding glass window 3 mounted therein. The frame 2 is cut away or rabbeted along its vertical inner surfaces as at 4 to provide recesses in which the sliding window may be received. Within each recess 4 I mount my improved form of channel 5 as by suitably securing means 6 at either end thereof, here shown as small tacks or brads. More of these brads than are shown may be used if necessary. When the channel member 5 is thus secured in position along each of the opposite sides of the door frame 1, and the sliding glass window 3 is mounted therein, the assembled window and channel members are held in place by strips of molding or similar means 8 which may be secured to the window frame 2 as by screws or other suitable means 9. It is desirable to construct a channel member 5 which can be utilized with windows of various thicknesses, inasmuch as a window glass varies somewhat in thickness in a given grade, and further because it may be desired to use a given channel with windows of various thicknesses or grades. Accordingly my preferred form of channel consists of a substantially U-shaped member having a bottom portion 10 and upstanding self-supporting sides 11. At the junction point of the bottom 10 and the sides 11, I form a longitudinally extending recess 12 so that the sides 11 may be moved together parallel to each other either with or without distorting the bottom portion depending upon the amount of the movement of the sides. For example as shown in Fig. 7 where a thin glass window 3 is assembled with the channel member, it will be observed that the side walls 11 have been moved into a position relatively close to each other, and that the recesses 12 have not only been closed up substantially completely, but that the bottom 10 of the channel has been somewhat distorted in the direction of the glass. This parallel movement of the sides 11 may of course be caused and controlled by the bearing of the molding 8 against the channel and the pressing of the channel against the opposite side of the frame 2.

It will be observed the glass is considerably thicker in Fig. 6 than in Fig. 7 and in this case the recesses 12 are not closed up to quite the same extent as in Fig. 7.

In Fig. 8 I have shown a modified form of retaining means for securing the channel and glass window in assembled relation. This securing means comprises a pair of oppositely disposed brackets 13 which may be in the form of metal angles secured to the window frame 2 on opposite sides of the window. In any of the foregoing securing means there is provision for the adjustment of one member with respect to the other so that various degrees of pressure may be exerted on the opposite sides of the channel member, thereby causing the same to press against the sides of the window with any predetermined pressure regardless of the thickness of the glass and without disturbing the substantially parallel arrangement of the sides 11 of the channel.

My improved guide channel, particularly when composed of soft rubber, is also susceptible of automatic or self-adjustment of the space between the sides when it is stretched lengthwise. In installing it in a window frame, one end may be secured in place and then it is stretched lengthwise until the side walls have moved toward each other sufficiently to accommodate the thickness of the particular pane of glass being assembled therewith. The end is then secured in place and so long as it remains fixed, the width of the channel will not vary appreciably. In this manner the channel adjusts itself to various glass thicknesses without aid of confining molding or frame parts. I believe this capacity for lengthwise stretching and crosswise contraction or movement of the sides is due in part to positioning the threads of the fabric on a bias or transverse to the length of the channel and in partly embedding them in the rubber, but it may be influenced by the recesses 12.

In Fig. 9 I have shown a modified form of channel, the full lines indicating the position of the sides 14 of the channel when assembled with a relatively thin glass window, and the dotted line indicating approximately the position assumed by the sides 14 with a thicker glass window.

Due to the wedge shaped recess in this channel member with the walls of the recess converging toward the open side of the member, the sides 14 of the channel member initially have substantially the full line position shown in Fig. 9, but with thicker glass the sides may be bent outwardly so that the channel becomes substantially rectangular in cross section as contrasted with the initial wedge shaped configuration. In this manner windows of different thicknesses may be accommodated within a certain range by a single size of channel. To provide for the indicated movement in the sides 14 of the channel member when a thicker glass is used, a space is left between the outside of the channel member and the adjacent frame 2 or molding 8 but it will be noted that since the molding need not directly engage the channel member, the latter has been permitted to have limited movement in the frame. (See Fig. 9).

My improved guide and retaining member 5 may be constructed from various materials, but I prefer to use rubber combined with a woven or knitted fabric such as cloth which is substantially antifriction to glass, and I prefer to arrange the fabric or cloth 15 in the channel member 5 so that the threads thereof will run on the bias with respect to the said channel, at an angle or transversely therewith thereby exposing the ends of all the threads along the open end of the sides 11. By so disposing the fabric in the channel, no threads will tend to become loosened and fray as may be the case if the fibres run substantially parallel to the open or free edge of the sides 11.

Although I may secure the lining member in the channel by various means, I have found it preferable to mold the rubber of the channel member 5 into the interstices of the lining member and in the case of a knitted or woven fabric 15 to cause the rubber to penetrate into the interstices of the said fabric even to the extent of passing substantially, although not entirely, therethrough since it is desirable to maintain all portions of the rubber out of contact with the glass. It will be understood that when the rubber passes entirely through the fabric or otherwise contacts with the glass, it being highly frictional against the glass, prevents easy sliding movement of the glass in the channel, but that this is avoided by preventing the rubber from completely passing through the fabric. It is, however, highly desirable that the rubber penetrate well into if not a greater portion of the distance through the said said fabric so that the two will be bound together in a substantially integral unit.

By uniting the rubber and fabric in this manner, a channel is formed which may be subjected to any desired usage either in manufacture, shipment or use without liability of the two parts becoming separated. Furthermore, the junction between these two parts is such that varying weather or climatic conditions are substantially without effect to cause separation of the parts.

Other foraminous materials which are capable of being similarly united to the rubber may, of course, be used as substitutes for the preferred fabric described hereinabove, provided such materials are relatively thin as contrasted with the rubber portion and do not tend to absorb moisture or dirt, and which may be so placed in the rubber portion as to be substantially invisible when assembled with a window as shown in the attached drawings.

A channel member constructed as herein described possesses the advantages of being capable of use with windows of various thicknesses, of securing the windows in position and guiding the same as they are moved up and down in the frame, while permitting practically non-frictional movement of the glass. Furthermore such channels are sightly in appearance, are of extremely long life and are subject to practically no deterioration or change in appearance due to the accumulation of dirt and other discoloring matter or the scuffing or wearing through of fabric exposed to the usual means employed for cleaning windows, doors or bodies especially of automobile vehicles.

Having thus described my invention so that those skilled in the art may practice the same, what I desire to secure by Letters Patent is defined in what is claimed.

What I claim is:—

1. A guide channel member for a sliding glass window consisting of a flexible resilient member formed with a bottom portion and upstanding self-supporting longitudinal side portions to provide a channel to receive a sliding glass window and a thin woven fabric covering substantially antifriction to glass and secured to the inner surfaces of the said bottom and side portions with the threads of the said fabric running at an angle to the free edges of the said side portions.

2. A guide channel member for a sliding glass window consisting of a rubber member formed with a bottom portion and upstanding self-supporting longitudinal slide portions to provide a channel to receive a sliding glass window, and a woven fabric relatively thin as compared with the thickness of the said side portions and substantially antifriction to glass secured to the said rubber member by having portions of the said member penetrating into but not entirely through the interstices of the said fabric, the threads of the said fabric extending at an angle to the longitudinal free edges of the said side members.

3. As a new article of manufacture a resilient substantially U-shaped window mounting and retaining member composed of rubber and comprising a distortable bottom portion having depressions in the inner surface along opposite sides thereof, self-supporting side portions having their inner surfaces substantially parallel to each other and adapted to be moved parallel toward each other when the latter is distorted, and a fabric liner secured to the inner surface of the said bottom and side portions by penetration of the rubber member into but not entirely through the interstices thereof, the said liner having all of its threads extending transversely of the said channel member.

4. A guide channel member for a sliding glass window comprising a rubber member having a bottom portion and oppositely disposed self-supporting side portions, and a substantially non-hygroscopic woven fabric liner relatively antifriction to glass as compared with rubber covering the inner surfaces of the said bottom and side members with the threads thereof extending at an angle to the length of the channel member, the liner being secured to the rubber by penetration of the rubber into the interstices of the liner.

In testimony whereof I have hereunto affixed my signature this 17th day of November, 1923.

WILLIAM C. FISCHER.